United States Patent Office 3,560,035
Patented Feb. 2, 1971

3,560,035
UNIVERSAL JOINT CONSTRUCTION
Georg Kindel, Lemforde, Hannover, Germany, assignor to Lemforder Metallwaren AG, Lemforde, Hannover, Germany
Filed Jan. 17, 1968, Ser. No. 698,636
Claims priority, application Germany, Jan. 19, 1967, L 55,522
Int. Cl. F16c *11/06*
U.S. Cl. 287—90
6 Claims

ABSTRACT OF THE DISCLOSURE

The construction of a ball and socket joint, particularly for the articulation of wheels of an automobile suspension system, includes a bearing shell construction which is arranged within an outer housing to provide a universal pivotal support for a ball portion of a journal pin. The bearing shell includes an annular projecting portion and a resilient cover member is engaged over the annular projecting portion and held within an annular recess defined in the outer housing. Automatic adjustment of the joint is effected by a spring element which is formed by the bearing shell itself. For this purpose, the bearing shell is advantageously made of a single hard plastic material which either includes a separate spring-like element formed therein or is formed of a material such that it provides an inward loading effect on the ball portion of the joint pin. To produce this action in accordance with the invention, the shell is formed such that it has an inwardly extending curvature as compared to the curvature of the ball head of the joint pin.

SUMMARY OF THE INVENTION

This invention relates, in general, to the construction of universal joints and, in particular, to a new and useful ball and socket joint, particularly for the suspension and articulation of the wheels of a motor vehicle and wherein the ball portion of the joint pin is supported within a housing on a bearing shell which is constructed of a material or includes a spring element which bears inwardly against the ball head to provide for automatic adjustment of the joint.

In order to equalize the play produced in a ball and socket joint by wear between the bearing shell and the ball head, it is known to provide spring elements incorporated within the housing to attempt to produce such adjustment. In many embodiments a coil spring bearing on the housing cover serves as a pressure-exerting readjustment element. The use of coil springs, however, leads to a complicated design of the joint and thereby increases the manufacturing cost.

In an attempt to overcome some of the disadvantages of some of the coil spring constructions, bearing shells have been made of a rubber elastic material and they are compressed in position so that they exert a pressure against the ball head to provide for adjustment of the joint due to wear. A disadvantage in such an arrangement is that the rubber elastic materials have poor running properties and are subject to permanent deformation so that the tension which they apply against the ball head becomes reduced materially because of wear and use and thus the bearing shells made of such materials do not meet the desired requirements. In some instances, a rubber elastic bearing shell is lined with an insert of steel or other abrasion-resistant material which has good sliding properties. In this way, a sufficient pressure can be achieved for the automatic readjustment of the joint and also a longer service life of the joint can be obtained with a smooth-running surface, but the manufacture of such joints is rather complicated and expensive.

In accordance with the present invention, there is provided a ball and socket joint construction which includes a bearing shell which is arranged within an outer housing such that an end cover for the housing bears against an annular projecting part of the shell. In addition, the shell is advantageously made of a hard plastic material and is formed with a curvature which runs inwardly, preferably at the top and the bottom in respect to the center of the ball-end of the joint pin which is to ride within he bearing shell. With the invention, the disadvantages of known constructions are overcome and a joint having optimum running properties, high abrasion resistance and long service life is produced with a minimum expenditure for the parts and of a construction such that automatic readjustment of the joint is insured. The bearing shell is made of a material having excellent sliding properties and great resistance to wear. An inward biasing force is exerted on the ball member which it supports by the construction of the bearing shell itself. Such a construction may include either the formation of the plastic itself with a curvature such that the top and/or bottom parts bear inwardly in respect to the ball joint, or the inclusion of a spring element within the plastic material which is curved to form an inward biasing effect on the ball at all times. The bearing shell is advantageously formed of a single unified piece, preferably with a small-sized top opening and with an annular projection against which the top cover of the outer housing bears. In some instances, the bearing shell may be slit along radial lines around the top opening as well as around the bottom opening for the pin joint.

The construction of the bearing shell is such that it may be made of a single abrasion-resistant material having excellent sliding properties, for example, of a plastic of great hardness, and sized to fit directly into the outer housing so that the manufacturing cost can be reduced. The dimensioning of the shell and its curvature can be controlled during manufacture to provide for a uniform inwardly acting spring loading of the ball so that an operating sliding surface for the ball is obtained which will remain smooth during the entire life of the joint. The one-piece formation of the bearing shell can be such that the entire spherical surface of the ball is supported and uneven stresses, including horizontal loads, can be absorbed.

Accordingly, it is an object of the invention to provide a ball and socket joint construction which includes an outer housing and a one-piece bearing shell of a resilient hard plastic material which fits into the interior of the housing and which is formed with a curvature such that it bears inwardly in resilient engagement with a ball head of a pin joint supported within the housing on the bearing shell.

A further object of the invention is to provide a bearing shell construction for a universal joint housing wherein the shell is made of a single piece of material such as a hard plastic having good sliding properties and wherein an inward tension is formed by the shell in respect to a ball head of a pin joint which is to be suspended therein by forming the interior radius such that it extends inwardly in respect to the center of the ball head and wherein the bearing shell is provided preferably with radial slits to permit expansion of the side walls thereof to receive the ball joint in resilient engagement.

A further object of the invention is to provide a ball joint construction and a bearing shell construction which are simple in design, rugged in construction and economical to manufacture.

The various features of novelty which characterize the invention are pointed out with particularity in the claims annexed to and forming a part of this specification. For a better understanding of the invention, its operaing advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 2:
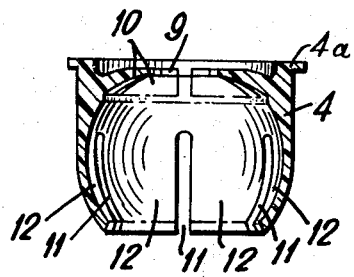
FIG. 2 is a transverse sectional view of the bearing shell in the unloaded state and removed from the housing.

Referring to the drawings in particular, the invention embodied therein comprises a universal joint or ball and socket joint having a joint housing 1 which receives a joint journal or pin 2 having a ball-shaped end 3 which is universally pivotally supported on a bearing shell 4 which is carried within the housing 1. The joint housing 1 is sealed against the entrance of moisture and dirt by an elastic bellows 5, in the usual manner the bellows 5 is arranged at the exit side 6 of the journal at the side through which the pin 2 extends. At the side opposite the journal exit opening 6, the joint housing 1 is closed by a rolled-end cover 7.

In accordance with the invention, the bearing shell 4 is advantageously made of a single piece or unitary part which is formed on its upper end with an annular rim 4a. The cover 7 bears downwardly against this annular rim and is seated behind a projection 1a of the housing 1. A free space remains between the cover 7 and a top portion 8 of the bearing shell 4.

Figure 1:
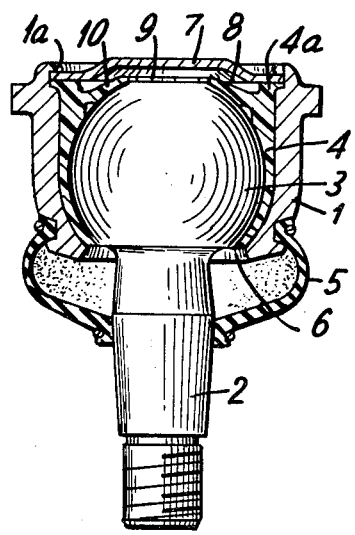
FIG. 1 is a longitudinal sectional view through a ball and socket joint constructed in accordance with the invention.
Figures 3, 4:
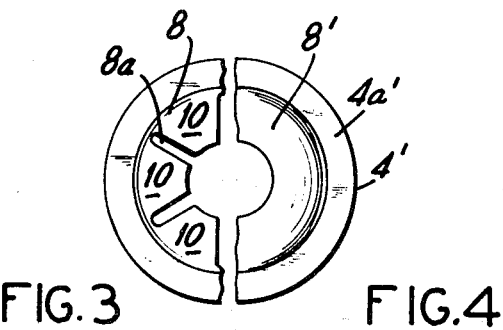
FIG. 3 is a partial top plan view of the bearing shell indicated in FIG. 2.
FIG. 4 is a view similar to FIG. 3 of another embodiment of the invention.

In the embodiment indicated in FIGS. 1, 2 and 3, the top portion 8 of the bearing shell 4 is provided with radial slits 8a dividing the top portion into segments 10 which are formed with a curvature which extends inwardly with respect to the curvature of the ball 3 so that there is a resilient engagement of the segments 10 against the ball surface. The bearing shell 4 is formed with a small central opening 9 at the top and a larger opening at the bottom to accommodate the joint pin 2.

On the side facing the journal exit at the opening 6, the bearing shell 4 is provided with open slits 11 which, in the embodiment illustrated, extend slightly beyond the center of the ball 3. The slits 11 divide the lower portion into segments 12 which are formed with a curvature such that they bear inwardly against the ball 3. The construction of the whole housing shell 4 is such that there is an inwardly directed biasing force exerted on the ball 3 at all times when the shell is positioned within the shell 4. The annular flanges 4a provide a means for holding the socket 4 in an oriented position within the housing 1 due to the action of the rim of the cover 7 thereon. In the embodiment in which the segments 10 and 12 are formed, the shell 4 can be easily mounted within the housing 1 because of the flexibility of the individual segments.

In the embodiment illustrated in FIG. 4, the top portion 8' of the shell 4' is made of a solid piece, and no slits are provided. An annular flange 4a' is provided which corresponds to the flange 4a of the other embodiment.

While specific embodiments of the invention have been shown and described in detail to illustrate the application of the inventive principles, it will be understood that the invention may be embodied otherwise without departing from such principles.

What is claimed is:

1. A universal joint construction, particularly for the suspension and articulation of wheels in motor vehicles, comprising a joint pin comprising an axially extending pin portion and a ball-shaped head secured to one end of said pin portion, a housing disposed about and in spaced relationship from said ball-shaped head, with said pin portion extending axially from said housing, the outer surface of said housing having a generally cylindrical shape with a first opening in one end and a second opening in the outer end and said pin portion of said joint pin extending through said first opening, a bearing shell of a unitary construction formed of a plastic material of good sliding property and high resistance to wear is disposed between and in surface contact with said ball-shaped head and the interior surface of said housing, said bearing shell extendnig between said first and second openings in said housing and having a first part thereof with its exterior surface in continuous surface contact with the interior surface of said housing and terminating at its end adjacent said second opening in said bearing shell in an annularly shaped outwardly directed flange, said housing having an annular groove formed therein adjacent its second opening for receiving said flange on said first part of said bearing shell, said first part having an opening therein adjacent to and in registration with the first opening in said housing and with said pin portion extending through the opening, the interior surface of said first part of said bearing shell disposed in surface contact with said ball-shaped head from its opening at said first opening in said housing to a plane disposed substantially normally to the axis of said pin portion of said joint pin and located between the mid-height of said ball-shaped head where it has its greatest transverse dimension between said first and said second openings in said housing and said second opening, the inner surface of said first part at its end adjacent said second opening in said housing is spaced outwardly from the surface of said ball-shaped head, and a second part extending from said first part adjacent said opening toward said second opening and being disposed in surface contact with said ball-shaped head and forming an opening in said bearing shell aligned with said second opening in said housing, said second part extending inwardly from the inner surface of said first part and having a radius of curvature which is smaller than the radius of curvature of said ball-shaped head which it contacts so that said second part has a resilient engagement with the juxtaposed surface of said ball-shaped head, a cover positioned across and closing said second opening in said housing, said groove in said housing at its second end arranged to secure said cover therein with the periphery of said cover disposed in contact with the surface of said flange on said first part, said cover disposed in spaced relationship from the juxtaposed surface of said second part of said bearing shell so that said second part can yield toward said cover, and the interior surface of said bearing shell at the juncture of said first and second part thereof is spaced from the surface of said ball-shaped head and forms an annular groove encircling said ball-shaped head.

2. A universal joint construction, as set forth in claim 1, wherein said second part of said bearing shell has a plurality of angularly spaced slits therein extending from the opening in said second part toward the opening in said first part and terminating in said second part adjacent the juncture between said second and first parts so that said second part is divided into a plurality of individual segments which bear resiliently against said ball-shaped head.

3. A universal joint construction, as set forth in claim 1, wherein said first part of said bearing shell having a plurality of angularly spaced slits formed therein extending from the opening in said first part toward the opening in the said second part of said bearing shell and the slits in said first part terminating in a transverse plane spaced from the juncture of said first and second parts.

4. A universal joint construction, as set forth in claim 1, wherein at least a spring element is formed within the plastic material constituting said second part of said bearing shell for providing an inwardly biasing effect for said second part on said ball-shaped head.

5. A universal joint bearing shell construction for a joint pin having a ball-shaped head and an axially extending pin portion, comprising a bearing shell of a unitary construction formed of a plastic material of good sliding property and high resistance to wear having a spherically shaped interior surface, said bearing shell having a first opening through which the pin portion of the joint pin is arranged to extend and a second opening disposed opposite to the first opening, said bearing shell comprising a first part extending for the height thereof from said first to said second opening and having an annular shaped outwardly directed flange located at its end adjacent the second opening, the interior surface of said first part of said bearing shell arranged to be in surface contact with the ball-shaped head of the joint pin from its first opening to a plane disposed substantially normally to the axis extending between the first and second openings in said bearing shell and located between the mid-height of said bearing shell where it has its greatest transverse dimension between the first and second openings and the second opening, and a second part extending from the interior surface of said first part adjacent said second opening to said second opening and arranged to be in surface contact with the ball-shaped head, said second part having a radius of curvature which is smaller than the radius of curvature of the ball-shaped head which is to be disposed in contact with its interior surface so that said second part has a resilient engagement with the juxtaposed surfaces of the ball-shaped head, the interior surface of said bearing shell at the juncture of said first and second parts thereof forming an annular groove encircling the interior surface and arranged to be disposed in spaced relationship from the surface of the ball-shaped head, said first part of said ball-shaped head having a plurality of angularly spaced open slits extending through said first part from the first opening in said bearing shell toward the second opening in said bearing shell and terminating at a point between the first opening and the juncture between said first and second parts thereof, a plurality of slits angularly spaced apart in second part of said bearing shell and extending from the second opening therein toward the first opening and terminating immediately adjacent the juncture of said first and second parts of said bearing shell, said slits in said first and second parts dividing said first and second parts into a plurality of elements arranged to bear resiliently inwardly against the ball-shaped head.

6. A universal joint construction, particularly for the suspension and articulation of wheels in motor vehicles, comprising an outer housing defining a curved interior cavity and having an exterior configuration of generally cylindrical shape with an opening at each end thereof, a bearing bushing of unitary construction formed of a hard elastic material having good sliding properties and high resistance to wear and the exterior surface of said bushing disposed in surface contact with the interior surface of said outer housing, said bearing bushing having an opening at each end thereof aligned with the openings in said outer housing, a hinge pin having a ball head portion, said ball head portion supported within said bearing bushing, the interior surfaces of said bearing bushing having a smaller radius of curvature than the outer surface of said ball-head portion of said hinge pin with which the interior surface is in contact so that a resilient engagement of said ball-head portion is afforded by the interior surface of said bearing bushing, said hinge pin extending through the opening in one end of said housing and the corresponding opening in said bearing bushing, a cover closing the opening in the other end of said housing, the portion of said bearing buushing in contact with said ball head portion of said hinge pin adjacent said cover being spaced from said cover, said bearing bushing including a plurality of angularly spaced slits extending from the opening therein adjacent said cover toward the opening therein through which said hinge pin portion extends for dividing said end of said bearing bushing into a plurality of segments for resiliently contacting said ball head portion, said bearing bushing comprising an extension portion secured to the outer surface thereof and disposed in engagement with the interior of said housing, said extension portion including an outwardly directed flange, said housing having an annular groove adjacent the end therein containing said cover for receiving and holding said cover and for receiving said flange so that said cover bears against said flange for securing it within said housing.

References Cited
UNITED STATES PATENTS

| | | | |
|---|---|---|---|
| 2,993,716 | 7/1961 | Langen | 287—90C |
| 2,999,708 | 9/1961 | Dudash | 287—87 |
| 3,063,744 | 11/1962 | Flumerfelt | 287—90AX |
| 3,089,718 | 5/1963 | Gottschald et al. | 287—90A |
| 3,210,105 | 10/1965 | Vogt | 287—87 |
| 3,220,755 | 11/1965 | Gottschald et al. | 287—87 |
| 3,233,929 | 2/1966 | Herbenar | 287—87 |
| 3,233,929 | 2/1966 | Herbenar | 287—87 |
| 3,413,023 | 11/1968 | Herbenar | 287—87 |

FOREIGN PATENTS

| | | | |
|---|---|---|---|
| 857,714 | 12/1952 | Germany | 287—90C |
| 532,569 | 8/1955 | Italy | 287—90C |
| 188,525 | 3/1964 | Sweden | 287—90A |
| 1,185,952 | 2/1959 | France | 287—87 |

DAVID J. WILLIAMOWSKY, Primary Examiner

A. V. KUNDRAT, Assistant Examiner